(12) United States Patent
Du et al.

(10) Patent No.: US 12,163,826 B1
(45) Date of Patent: Dec. 10, 2024

(54) METHOD FOR IDENTIFYING VIBRATION MAGNITUDE OF TUNNEL BORING MACHINE (TBM) MAIN BEAM USING GEOLOGICAL FEATURE PARAMETER AND TUNNELING FEATURE PARAMETER CONSTRUCTED BASED ON TBM TUNNELING PARAMETERS

(71) Applicants: Shijiazhuang Tiedao University, Shijiazhuang (CN); China State Railway Group Co., Ltd., Beijing (CN)

(72) Inventors: Lijie Du, Shijiazhuang (CN); Yalei Yang, Shijiazhuang (CN); Qingwei Li, Shijiazhuang (CN); Guangchun Xu, Beijing (CN); Xun Luo, Beijing (CN)

(73) Assignees: Shijiazhuang Tiedao University, Shijiazhuang (CN); China State Railway Group Co., Ltd., Beijing (CN)

( * ) Notice: Subject to any disclaimer, the term of this patent is extended or adjusted under 35 U.S.C. 154(b) by 0 days.

(21) Appl. No.: 18/618,095

(22) Filed: Mar. 27, 2024

(30) Foreign Application Priority Data

Aug. 21, 2023 (CN) .......................... 202311052902.5

(51) Int. Cl.
*G01H 1/00* (2006.01)
*E21D 9/00* (2006.01)

(52) U.S. Cl.
CPC .............. *G01H 1/003* (2013.01); *E21D 9/003* (2013.01)

(58) Field of Classification Search
CPC ................................ G01H 1/003; E21D 9/003
USPC ............................................................ 702/56
See application file for complete search history.

(56) References Cited

U.S. PATENT DOCUMENTS 8,172,334 B2 * 5/2012 Lindbergh .............. E21D 9/003
299/1.8

* cited by examiner

*Primary Examiner* — Aditya S Bhat
(74) *Attorney, Agent, or Firm* — Anthony E. Bennett

(57) ABSTRACT

Disclosed is a method for identifying a vibration magnitude of a TBM main beam using a geological feature parameter and a tunneling feature parameter constructed based on tunnel boring machine (TBM) tunneling parameters. The method includes: collecting vibration signals of the main beam and tunneling parameters of a TBM through an in-situ tunneling test and preprocessing such data, researching a correlation law between the tunneling parameters and a vibration feature root mean square (RMS), providing two feature parameters of a field penetration index (FPI) and a cutterhead power index (TNI), establishing a multivariate regression prediction model for vibration of the TBM main beam based on the feature parameters, and verifying and analyzing the model under different surrounding rock conditions. An average relative error of prediction is 12% or within, and a quantitative relation between the vibration features of the main beam and the feature parameters of the TBM is given.

4 Claims, 15 Drawing Sheets

*a) Source signal*

*b) Preprocessed signal*

FIG. 3

| | RMS in an axial direction | Thrust speed | Back left support pressure | Back right support pressure | Penetration | Total propulsion | Rod cavity pressure of a top shield cylinder | Rod cavity pressure of a thrust cylinder | Rotation speed of a cutterhead | Torque of a cutterhead | Average current of a cutterhead | RMS in an axial direction | FP1 | TP1 | Pressure of a thrust pump | Driving pressure of a main machine belt conveyor | Pump pressure of a main machine belt conveyor |
|---|---|---|---|---|---|---|---|---|---|---|---|---|---|---|---|---|---|
| RMS in an axial direction | 1.0 | -0.87 | -0.64 | -0.95 | 0.92 | 0.74 | 0.37 | -0.96 | -0.51 | 0.92 | 0.98 | 1.0 | -0.89 | 0.89 | 0.79 | 0.25 | 0.25 |
| Thrust speed | -0.87 | 1.0 | 0.43 | 0.80 | -0.86 | -0.81 | -0.32 | 0.90 | 0.47 | -0.88 | -0.90 | -0.87 | 0.72 | -0.89 | -0.85 | -0.19 | -0.18 |
| Back left support pressure | -0.84 | 0.43 | 1.0 | 0.67 | 0.49 | -0.039 | -0.017 | 0.55 | 0.065 | -0.44 | -0.56 | -0.64 | 0.81 | -0.36 | -0.11 | -0.048 | -0.016 |
| Back right support pressure | -0.95 | 0.80 | 0.67 | 1.0 | -0.79 | -0.59 | -0.28 | 0.86 | 0.38 | -0.78 | -0.92 | -0.95 | 0.83 | -0.77 | -0.64 | 0.0089 | 0.0084 |
| Penetration | 0.92 | -0.86 | 0.49 | -0.79 | 1.0 | 0.85 | 0.35 | -0.99 | -0.56 | 0.99 | 0.95 | 0.92 | -0.95 | 0.92 | 0.87 | 0.41 | 0.41 |
| Total propulsion | 0.74 | -0.81 | -0.039 | -0.59 | 0.85 | 1.0 | 0.48 | -0.84 | -0.64 | 0.82 | 0.74 | 0.74 | -0.92 | 0.99 | 0.99 | 0.48 | 0.47 |
| Rod cavity pressure of a top shield cylinder | 0.37 | -0.32 | -0.017 | -0.28 | 0.35 | 0.48 | 1.0 | -0.39 | -0.32 | 0.42 | 0.39 | 0.37 | -0.50 | 0.42 | 0.74 | 0.47 | 0.46 |
| Rod cavity pressure of a thrust cylinder | -0.96 | 0.90 | 0.55 | 0.86 | -0.99 | -0.84 | -0.39 | 1.0 | 0.55 | -0.98 | -0.96 | -0.96 | 0.89 | -0.93 | -0.87 | -0.37 | -0.37 |
| Rotation speed of a cutterhead | -0.51 | 0.47 | 0.065 | 0.38 | -0.56 | -0.64 | -0.32 | 0.55 | 1.0 | -0.58 | -0.55 | -0.51 | 0.34 | -0.59 | -0.64 | -0.27 | -0.25 |
| Torque of a cutterhead | 0.92 | -0.88 | -0.44 | -0.78 | 0.99 | 0.82 | 0.42 | -0.98 | -0.58 | 1.0 | 0.96 | 0.92 | -0.96 | 0.93 | 0.85 | 0.47 | 0.47 |
| Average current of a cutterhead | 0.98 | -0.90 | -0.56 | -0.92 | 0.95 | 0.74 | 0.39 | -0.96 | -0.55 | 0.96 | 1.0 | 0.98 | -0.87 | 0.93 | 0.79 | 0.25 | 0.25 |
| RMS in an axial direction | 1.0 | -0.87 | -0.64 | -0.95 | 0.92 | 0.74 | 0.37 | -0.96 | -0.51 | 0.92 | 0.98 | 1.0 | -0.89 | 0.89 | 0.79 | 0.25 | 0.25 |
| FP1 | -0.89 | 0.72 | 0.81 | 0.83 | -0.95 | -0.92 | -0.50 | 0.89 | 0.34 | -0.96 | -0.87 | -0.89 | 1.0 | -0.70 | -0.57 | -0.21 | -0.22 |
| TP1 | 0.89 | -0.89 | -0.36 | -0.77 | 0.92 | 0.99 | 0.42 | -0.93 | -0.59 | 0.93 | 0.93 | 0.89 | -0.70 | 1.0 | 0.93 | 0.52 | 0.51 |
| Pressure of a thrust pump | 0.79 | -0.85 | -0.11 | -0.64 | 0.87 | 0.99 | 0.74 | -0.87 | -0.64 | 0.85 | 0.79 | 0.79 | -0.57 | 0.93 | 1.0 | 0.42 | 0.41 |
| Driving pressure of a main machine belt conveyor | 0.25 | -0.19 | -0.00048 | -0.080 | 0.41 | 0.48 | 0.47 | -0.37 | -0.27 | 0.47 | 0.34 | 0.25 | -0.21 | 0.52 | 0.42 | 1.0 | 1.0 |
| Pump pressure of a main machine belt conveyor | 0.25 | -0.18 | -0.016 | -0.084 | 0.41 | 0.47 | 0.46 | -0.37 | -0.25 | 0.47 | 0.34 | 0.25 | -0.22 | 0.51 | 0.41 | 1.0 | 1.0 |

METHOD FOR IDENTIFYING VIBRATION MAGNITUDE OF TUNNEL BORING MACHINE (TBM) MAIN BEAM USING GEOLOGICAL FEATURE PARAMETER AND TUNNELING FEATURE PARAMETER CONSTRUCTED BASED ON TBM TUNNELING PARAMETERS

CROSS REFERENCE TO RELATED APPLICATION

This patent application claims the benefit and priority of Chinese Patent Application No. 202311052902.5, filed with the China National Intellectual Property Administration on Aug. 21, 2023, the disclosure of which is incorporated by reference herein in its entirety as part of the present application.

TECHNICAL FIELD

The present disclosure belongs to the technical field of tunnel monitoring, in particular to a method for identifying a vibration magnitude of a tunnel boring machine (TBM) main beam using a geological feature parameter and a tunneling feature parameter constructed based on TBM tunneling parameters.

BACKGROUND

A tunnel boring machine (TBM) plays an increasingly prominent role in the development and construction of underground space on account of its safety and high efficiency. When tunneling in a complex geological environment, it will suffer random variations in great thrust, great torque and overturning torque throughout due to the strong impact excitation of rock-breaking force of cutters. As a result, parts of the TBM will vibrate severely, and it is likely to cause fatigue damage to structural parts, increase the failure rate of the TBM and influence the construction speed of the TBM. In view of that, it is essential to grasp the amplitude of vibration of the TBM in real time.

In recent years, the research into TBM vibration has yielded some results in both theoretical analysis and field tests. It can be concluded from this research that the TBM vibration is closely tied to geological conditions, apparatus specifications, tunneling parameters, etc. However, it is still a pressing problem that monitoring is likely to be interrupted due to damage on a sensor when a cutterhead of the TBM works in a moist and dusty environment with strong vibration, great impact and high wear.

SUMMARY

An objective of the present disclosure is to provide a method for identifying a vibration magnitude of a TBM main beam using a geological feature parameter and a tunneling feature parameter constructed based on TBM tunneling parameters for solving the technical problem that in the prior art, vibration monitoring of a main beam can be interrupted since a sensor mounted on the main beam is likely to be damaged due to a harsh working environment.

In order to solve the above technical problem, a technical solution adopted in the present disclosure is as follows:

A vibration prediction method based on a geological feature parameter and a tunneling feature parameter for a TBM main beam includes the following steps:

step 1, data collection:
arranging a vibration measurement point in a front section of the TBM main beam, performing an in-situ tunneling test, collecting data of tunneling parameters, geological parameters and vibration parameters of the main beam of a TBM during tunneling, and establishing a database;

step 2, preprocessing data: preprocessing the tunneling parameters and preprocessing the vibration parameters of the main beam;

step 3, selecting data features:
determining that four key tunneling parameters of the TBM have strong correlation with a vibration root mean square (RMS) of the TMB main beam by a data statistics method, where the four tunneling parameters include a penetration (P), a total thrust (F), a cutterhead rotation speed (N) and a cutterhead torque (T);

step 4, determining a correlation law between a vibration feature of the main beam and the tunneling parameters of the TBM:

(1) determining influence of the tunneling parameters on the vibration feature of the TBM main beam, where an internal feedback relationship exists among the tunneling parameters of the penetration (P), the total thrust (F), the cutterhead rotation speed (N) and the cutterhead torque (T) of the TBM during tunneling, that is, the greater the total thrust (F) is, the greater the penetration (P) is; a tunneling speed (V)=N*P; and a cutterhead power is equal to the cutterhead torque (T) multiplied by the rotation speed (N);

(2) selecting a feature parameter, where a field penetration index (FPI) of the geological feature parameter and a cutterhead power index TNI of the tunneling feature parameter have positive correlation with the vibration feature RMS; and step 5, establishing a multivariate linear regression model:
collecting in-situ tunneling test data, establishing a data set of the vibration RMS and the tunneling feature parameter, performing multivariate linear regression on the data set, and obtaining a relation model of the vibration RMS with the FPI and the TNI as shown in the following formula (6):

$$RMS = \alpha \cdot (-8.51421 \times 10^{-4} \cdot FPI + 1.80941 \cdot TNI + 0.74997) \qquad (6)$$

where $\alpha$ denotes a coefficient of surrounding rock, a correlation coefficient $R^2$ of the relation model reaches 0.98, and the FPI and the TNI have an obvious correlation with the vibration RMS.

Preferably, the performing an in-situ tunneling test in step 1 includes:

(1) performing a test 1: keeping the cutterhead rotation speed (N) constant, adjusting the penetration (P), and collecting vibration information of the TBM main beam;

(2) performing a test 2: keeping the penetration (P) constant, adjusting the cutterhead rotation speed (N), and collecting a vibration signal of the TBM main beam;

(3) performing a test 3: collecting vibration information of the TBM during tunneling under different surrounding rock conditions.

Preferably, the preprocessing data in step 2 includes:
pre-processing the tunneling parameters: forming a decision function f(x) as shown in formula (1) by selecting control parameters the cutterhead rotation speed (N), a thrust speed v, the total thrust (F), the cutterhead torque (T) and the penetration (P) of the TBM, and determining a working state of the TBM by determining whether a value of the function is equal to 0, where f(x)=1 indicates a normal working state, and f(x)=0 indicates a non-working state;

$$f(x) = f(N) \cdot f(v) \cdot f(F) \cdot f(T) \cdot f(P) \quad (1)$$

$$f(x) = \begin{cases} 0, & (x = 0) \\ 1, & (x \neq 0) \end{cases}$$

where f(N), f(v), f(F), f(T) and f(P) denote binary decision functions of the cutterhead rotation speed, the cutterhead thrust, the thrust speed, the cutterhead torque and the penetration respectively;

pre-processing the vibration parameters of the main beam: removing a trend item of a vibration signal collected of the main beam by a polynomial least square method and performing direct current removal and filtering, and performing analysis with an effective value of acceleration that denotes signal vibration energy, where the effective value of vibration acceleration of the main beam is computed by formula (2) as follows:

$$x_{RMS} = \left(\frac{1}{n}\sum_{i=0}^{n-1} x_i^2\right)^{\frac{1}{2}} \quad (2)$$

where $x_i$ denotes a vibration acceleration and $x_{RMS}$ denotes the effective value of the vibration acceleration.

Preferably, step 4 includes:
(1) performing regression on a relation between the tunneling parameters and a vibration feature RMS with an exponential model, a linear model, a polynomial model, a power function model and a logarithmic model, evaluating an advantage and a disadvantage of the regression model with the correlation coefficient $R^2$, and establishing an optimal regression model, where the correlation coefficient $R^2$ is computed by formula (3) as follows:

$$R^2 = 1 - \frac{\sum_{i=1}^{m}(\tilde{y}_i - y_i)^2}{\sum_{i=1}^{m}(\ddot{y}_i - y_i)^2} \quad (3)$$

where $\tilde{y}_i$ denotes a predicted value of a sample, $\ddot{y}_i$ denotes an average, and $y_i$ denotes an actual value; and (2) computing the field penetration index (FPI) by formula (4) as follows:

$$FPI = F_n/P \quad (4)$$

where $F_n$ denotes a single-cutter thrust, kN; and P denotes a penetration, mm/r; and computing the cutterhead power index TNI by formula (5) as follows:

$$TNI = T \cdot N/9550 \quad (5)$$

where T denotes a cutterhead torque at kN·m; and N denotes a cutterhead rotation speed at r/min.

The technical solution used above has the beneficial effects as follows: compared with the prior art, according to the present disclosure, the vibration signals of the main beam and the tunneling parameters of the TBM are collected through the in-situ tunneling test and such data are preprocessed at first. Then, the correlation law between the tunneling parameters and the vibration feature RMS is researched. Two feature parameters of the field penetration index (FPI) and the cutterhead power index (TNI) are provided, and a multivariate regression prediction model is established for vibration of the TBM main beam based on the feature parameters. The model is verified and analyzed under different conditions in the surrounding rock. An average relative error of prediction is within 12% and a quantitative relation between the vibration features of the main beam and the feature parameters of the TBM is given. In this way, vibration information of the TBM main beam can be sensed in real time without mounting a vibration testing system, and a desirable prediction effect is achieved, which is of great significance to TBM information intelligence. The present disclosure can solve the problems that a sensor mounted on a TBM is easy to damage and is poor in reliability, and vibration responses of key components of a main machine of the TBM are difficult to measure with the sensor.

BRIEF DESCRIPTION OF THE DRAWINGS

The present disclosure will be further described in detail below with reference to accompanying drawings and specific implementation manners.

FIG. 3 is a thermal diagram showing the correlation between vibration features and tunneling parameters of a TBM according to an embodiment of the present disclosure;

DETAILED DESCRIPTION OF THE EMBODIMENTS

Technical solutions in embodiments of the present disclosure will be clearly and completely described in the following with reference to the accompanying drawings in the embodiments of the present invention. Apparently, the described embodiments are merely some embodiments rather in than all embodiments of the present disclosure. All other embodiments derived by those skilled in the art from the embodiments of the present disclosure without creative efforts shall fall within the protection scope of the present disclosure.

A project selected by the present disclosure has the general situation as follows: a tunnel of a certain bid section of the project has a total length of 38.25 km and is mainly composed of tuff mixed with tuff breccia, tuff sandstone and granodiorite. In fact, a total proportion of Class II and III of surrounding rock reaches 82.81%, a total proportion of Class IV and V of surrounding rock reaches 17.19%, and distribution of these rocks is irregular. The buried depth of the tunnel is 475 m-640 m. The bid section adopts two TBM blind heading constructions. Specifically, TBM7 and TBM8 are assembled for tunneling from a middle adit T4 using a method of 'one tunnel and two TBMs'. A tunneling length of TBM7 is 17.88 km, and a tunneling length of TBM8 is 19.64 km. According to the present disclosure, a typical tunnel section of TBM7 is mainly selected for an in-situ tunneling test to establish a prediction model, and typical tunnel sections of TBM7 and TBM8 are separately selected for verification and analysis of the reliability and universality of the model.

The project mainly adopts open TBM construction with main technical parameters shown in Table 1:

TABLE 1

Main technical parameters of the TBM

| Parameter | Value |
|---|---|
| Excavation diameter/mm | 7030 |
| Number of cutters | 49 |
| Driving power of a cutterhead/kW | 350 × 6 = 2100 |
| Total thrust of a cutterhead/kN | 23562@300 bar |
| Maximum rotation speed of a cutterhead/r · min$^{-1}$ | 0-10.6 |
| Torque of a cutterhead /kN · m | 4410@5.5 r/min |
| Jam release torque of a cutterhead/kN · m | 6620@0.5 r/min |

Figure 1:
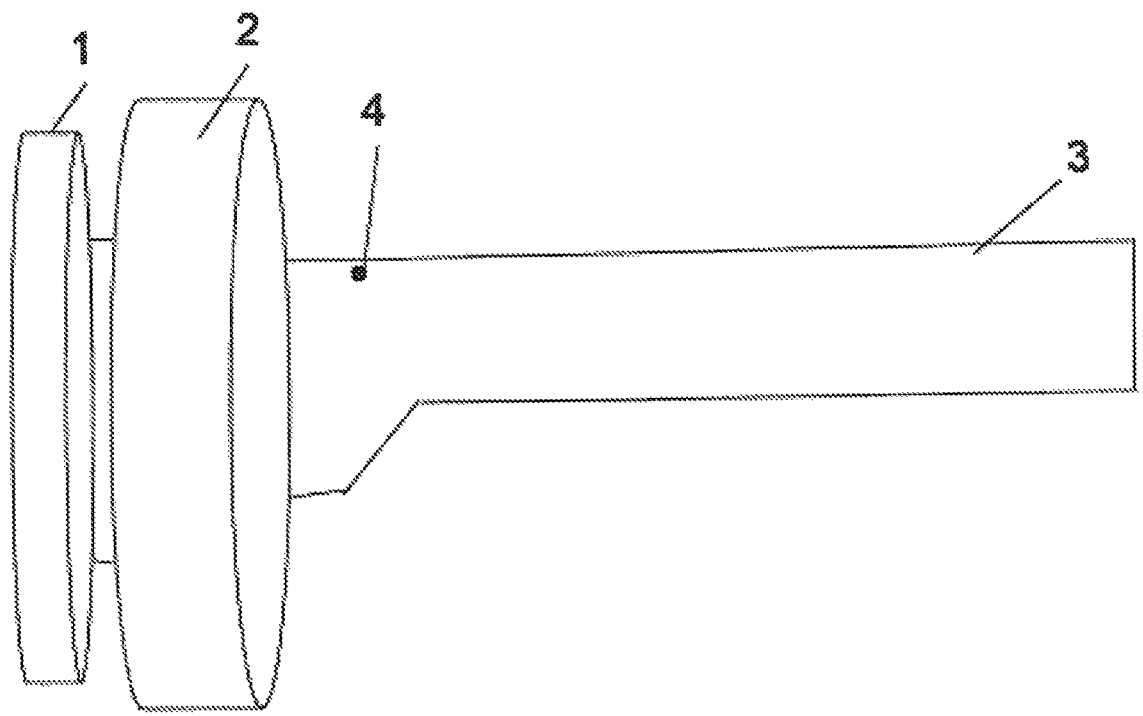
FIG. 1 is a schematic diagram showing the arrangement of vibration measurement points in a method for identifying a vibration magnitude of a TBM main beam using a geological feature parameter and a tunneling feature parameter constructed based on TBM tunneling parameters according to an embodiment of the present disclosure, where 1 denotes a cutterhead; 2 denotes a shield; 3 denotes a main beam; and 4 denotes a measurement point.

The embodiment of the present disclosure provides a method for identifying a vibration magnitude of a TBM main beam using a geological feature parameter and a tunneling feature parameter constructed based on TBM tunneling parameters. The vibration prediction method includes:

Step 1, data collection:
  arrange a vibration measurement point in a front section (as shown in FIG. 1) of the TBM main beam, perform an in-situ tunneling test on a typical tunnel section, collect data of tunneling parameters, geological parameters and vibration parameters of the main beam of a TBM during tunneling, and establish a database. The step of performing an in-situ tunneling test includes:
  (1) perform a test 1: keep the cutterhead rotation speed (N) constant, adjust the penetration (P), and collect vibration information of the TBM main beam;
  (2) perform a test 2: keep the penetration (P) constant, adjust the cutterhead rotation speed (N), and collect a vibration signal of the TBM main beam; and
  (3) perform a test 3: collect vibration information of the TBM during tunneling under different surrounding rock conditions.

Step 2, preprocess data:
pre-process the tunneling parameters. The TBM suffers comprehensive interference from its own factors and complex tunneling environment during tunneling, and a data collection system will inevitably have missing data or abnormal values. As a result, it is necessary to remove the abnormal values first to avoid a great impact on the analysis results. A decision function f(x) is formed as shown in formula (1) by selecting control parameters the cutterhead rotation speed (N), a thrust speed v, the total thrust (F), the cutterhead torque (T) and the penetration (P) of the TBM, and a working state of the TBM is determined by determining whether a function value is equal to 0, where f(x)=1 indicates a normal working state, and f(x)=0 indicates a non-working state. In order to avoid abnormal influence of data of tunneling start, tunneling end, a free-load pushing stage, etc., data for 1 min before the tunneling start and before the tunneling end are deleted, and at the same time, abnormal data are eliminated according to the pauta criterion.

$$f(x) = f(N) \cdot f(v) \cdot f(F) \cdot f(T) \cdot f(P) \qquad (1)$$

$$f(x) = \begin{cases} 0, & (x = 0) \\ 1, & (x \neq 0) \end{cases}$$

In the formula, f(N), f(v), f(F), f(T) and f(P) denote binary decision functions of the cutterhead rotation speed, the cutterhead thrust, the thrust speed, the cutterhead torque and the penetration respectively.

Figure 2A:
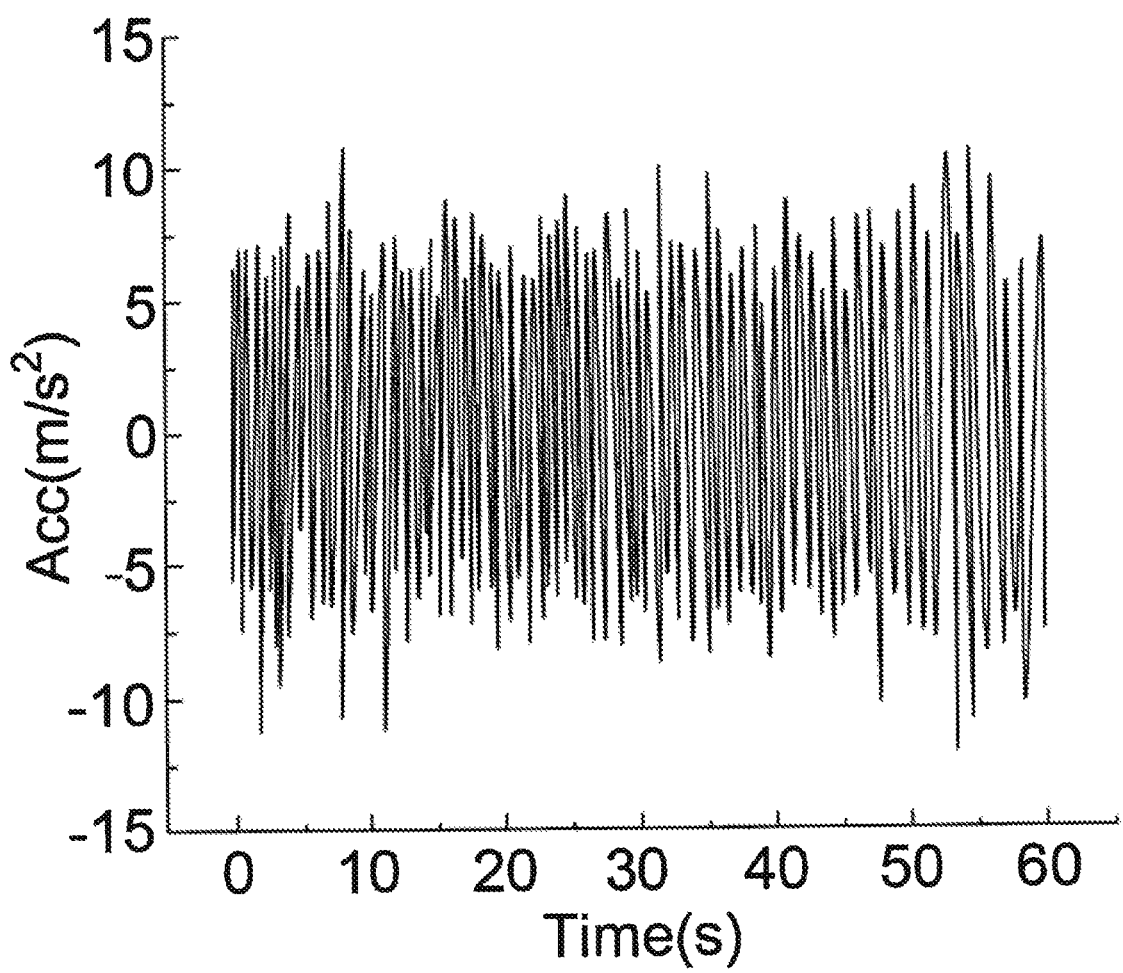
FIGS. 2A-B are diagram showing vibration signals, before and after preprocessing, of vibration of the TBM main beam according to an embodiment of the present disclosure.
Figure 2B:
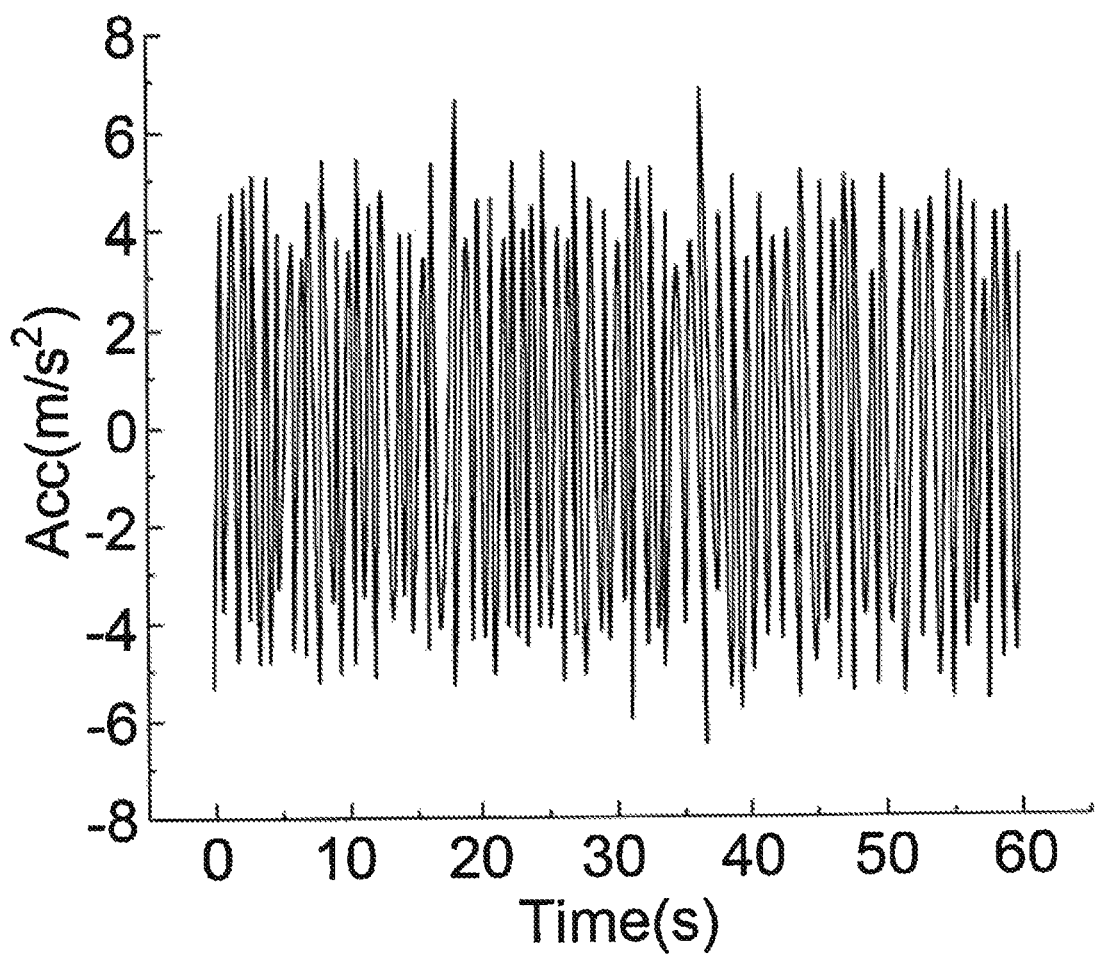

The vibration parameters of the main beam are pre-processed: since the main beam has to bear a response caused by impact vibration of a cutterhead, a vibration amplitude fluctuates widely. A trend item of a vibration signal collected of the main beam is removed by a polynomial least square method and direct current removal and filtering are performed, where a vibration source signal and a pre-processing signal are shown in FIGS. 2A-B. Analysis is performed with an effective value of acceleration that denotes signal vibration energy. Since vibration is the greatest in a tunneling direction (that is, an axial direction), the present disclosure studies the relation between an axial vibration RMS and the tunneling parameters, and the effective value of the vibration acceleration of the main beam is computed by formula (2) as follows:

$$x_{RMS} = \left(\frac{1}{n}\sum_{i=0}^{n-1} x_i^2\right)^{\frac{1}{2}} \qquad (2)$$

where $x_i$ denotes a vibration acceleration and $x_{RMS}$ denotes the effective value of the vibration acceleration.

Step 3, select data features:
  during tunneling of the TBM, the vibration is mainly influenced by geological factors, apparatus parameters and tunneling parameters. A plurality of typical tunnel sections are selected for an in-situ tunneling test, and there are 200 tunneling parameters to be collected during tunneling of the TBM. Pearson correlation analysis is performed on 30 tunneling parameters at stable tunneling sections and the vibration feature RMS of the TBM (as shown in FIG. 3). It is determined that the four most important tunneling parameters (a penetration (P), a total thrust (F), a cutterhead rotation speed (N) and a cutterhead torque (T)) have strong correlation with the vibration RMS of the TBM main beam.

A Pearson correlation coefficient is obtained through analysis with data statistics software, as shown in FIG. 3. The Pearson correlation coefficient is a method to measure a degree of correlation between two variables, and a value range from −1 to 1. The correlation coefficient between two variables is defined as a quotient of a covariance and a standard deviation, as shown in the following formula:

$$\rho_{X,Y} = \frac{\text{cov}(X, Y)}{\sigma_X \sigma_Y} = \frac{E[(X - \mu_X)(Y - \mu_Y)]}{\sigma_X \sigma_Y}$$

In the formula, $\rho_{X,Y}$ denotes a population Pearson correlation coefficient of variables X and Y;
  cov (X, Y) denotes a population covariance of variables X and Y;
  $\sigma_X$ denotes a population standard deviation of variable X;
  $\sigma_Y$ denotes a population standard deviation of variable Y;
  $\mu_X$ denotes a population average of variable X;
  $\mu_Y$ denotes a population average of variable Y; and
  E denotes an expectation.

Step 4, determine a correlation law between a vibration feature of the main beam and the tunneling parameters of the TBM:
  (1) determine influence of the tunneling parameters on the vibration feature of the TBM main beam, where an internal feedback relationship exists among the tunneling parameters of the penetration (P), the total thrust (F), the cutterhead rotation speed (N) and the cutterhead torque (T) of the TBM during tunneling, that is, the greater the total thrust (F) is, the greater the penetration (P) is; a tunneling speed V=N*P; and a cutterhead power is equal to the cutterhead torque (T) multiplied by the rotation speed (N).

During tunneling, a TBM operator will timely adjust the cutterhead rotation speed and the penetration according to the surrounding rock conditions and experience of the operator. However, the cutterhead rotation speed is generally constant according to a slag discharging capacity when the geological conditions are stable, so the penetration is a parameter that must be controlled directly in this case. However, due to changing geological conditions, cutter wearing, etc., the penetration cannot keep a certain value, but fluctuates around a certain set value. In this way, changes in the total thrust, the tunneling speed and the cutterhead torque are caused. The changes in these parameters can change interaction force between the TBM and make the TBM vibrate accordingly. To this end, it is necessary to research the correlation law between the tunneling parameters and TBM vibration to establish an interaction model of the TBM.

Regression is performed on a relation between the tunneling parameters and a vibration feature RMS with an exponential model, a linear model, a polynomial model, a power function model and a logarithmic model, an advantage and a disadvantage of the regression model are evaluated with the correlation coefficient $R^2$, and an optimal regression model is established, where the correlation coefficient $R^2$ is computed by formula (3) as follows:

$$R^2 = 1 - \frac{\sum_{i=1}^{m}(\tilde{y}_i - y_i)^2}{\sum_{i=1}^{m}(\ddot{y}_i - y_i)^2} \quad (3)$$

In the formula, $\tilde{y}_i$ denotes a predicted value of a sample, $\ddot{y}_i$ denotes an average, and $y_i$ denotes an actual value.

According to an optimal regression model determined by the correlation coefficient $R^2$, regression analysis on the penetration (P) and the vibration RMS is performed, and the optimal regression model is an exponential function of $R^2$=0.96012:

RMS=1.02967·e0.21005·P

For regression analysis on the total thrust (F) and the vibration RMS, an optimal regression model is a linear function of $R^2$=0.98105:

RMS=3.91291×10$^{-4}$·F$^{-2.3221}$

For regression analysis on the cutterhead torque (T) and the vibration RMS, an optimal regression model is a linear function of $R^2$=0.98127:

RMS=0.0013·T+0.67542

For regression analysis on the parameter of geological feature FPI and the vibration RMS, an optimal regression model is a linear function of $R^2$=0.62955:

RMS=0.08145·FPI+0.78729

For regression analysis on the tunneling feature parameter and the vibration RMS, an optimal regression model is a linear function of $R^2$=0.98094:

RMS=0.84171·TNI+0.66902

Influence of the tunneling parameters on the vibration RMS of the main beam is analyzed below.
  1) Analysis of the influence of the cutterhead rotation speed (N) on the vibration RMS: the greater the rotation speed, the greater the vibration RMS.

Figure 4:
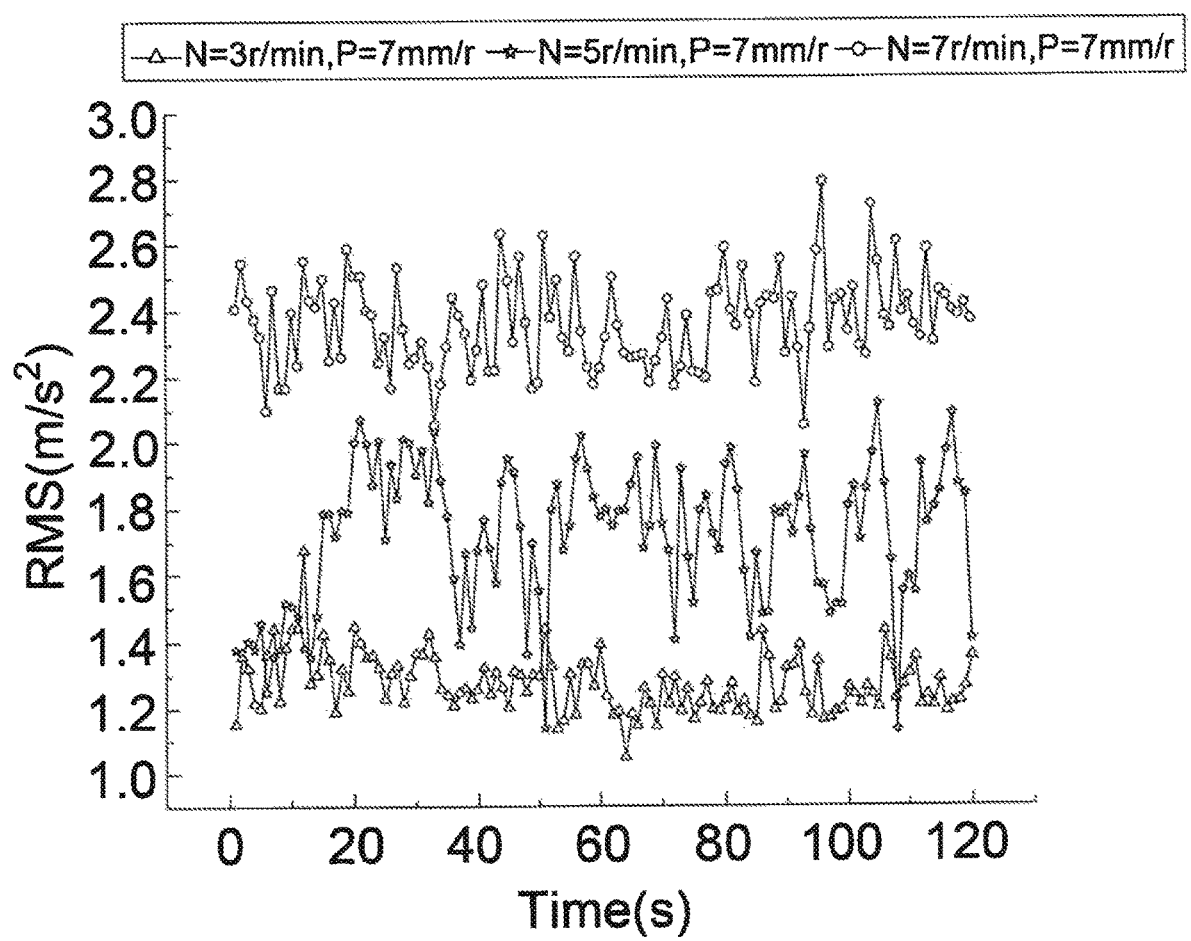
FIG. 4 shows vibration root mean squares (RMS) at different rotation speeds according to an embodiment of the present disclosure.

A test tunnel section is selected with a pile number of 181+660.2–181+662.05, Class II complete surrounding rock and lithology of tuff sandstone. Vibration of a TBM during stable tunneling at different cutterhead rotation speeds (N=3 r/min, N=5 r/min, n=7 r/min) and a constant penetration (P=7 mm/r) is monitored, and influence of the rotation speed on the vibration RMS is obtained as shown in FIG. 4. It can be concluded from analysis in the figure that there is an obvious variation in the vibration RMS at three different speeds, that is, the greater the rotation speed, the greater the vibration RMS, and the vibration RMS fluctuated, which indicates that the speed has a great influence on the vibration RMS of the TBM.

Figure 5:
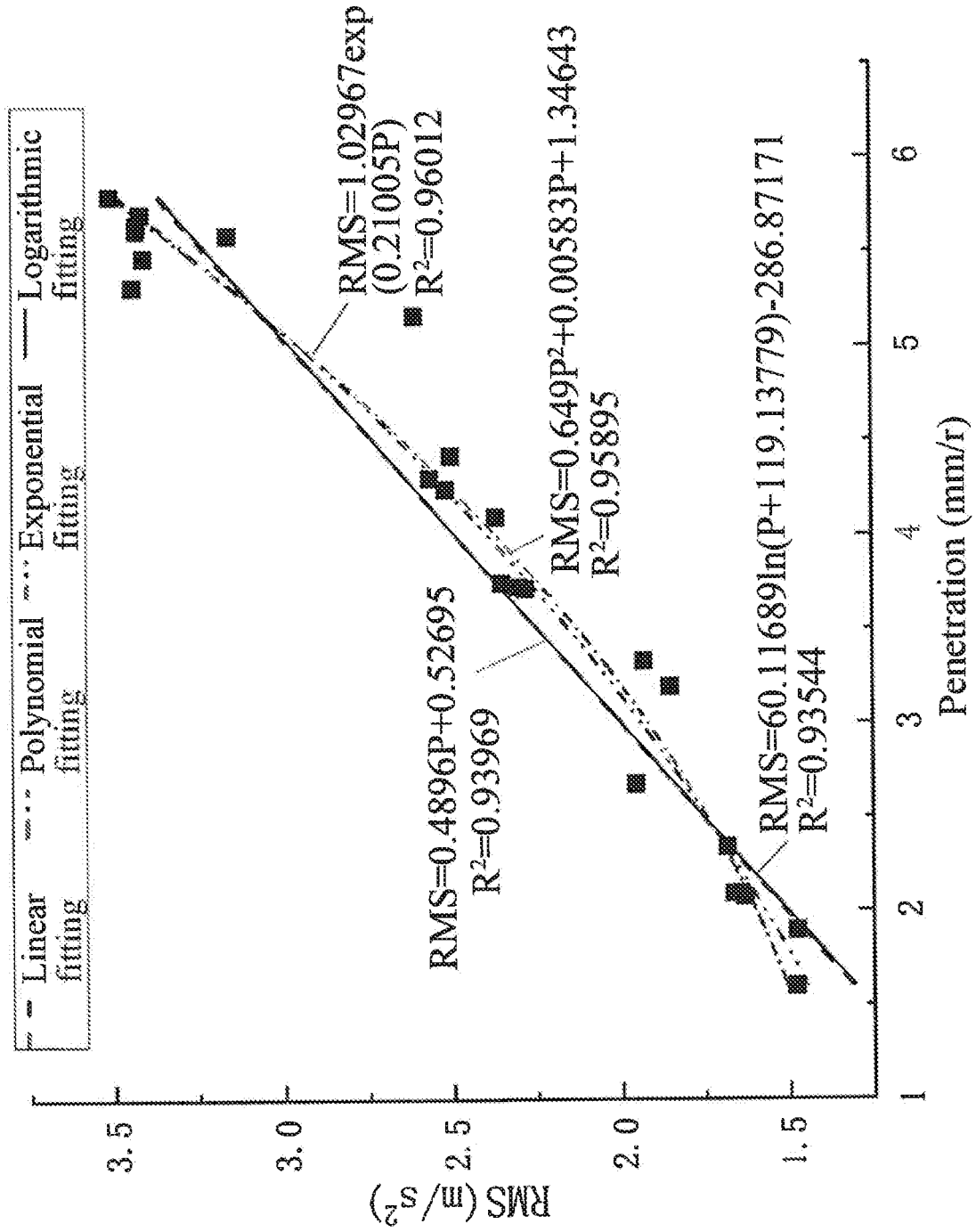
FIG. 5 is a diagram showing the correlation between penetrations and RMS at different rotational speeds according to an embodiment of the present disclosure.

2) Analysis of influence of the penetration (P) on the vibration RMS: TBM vibration signals and tunneling parameters are collected for establishing a data set, and a correlation law is analyzed. A correlation between the penetration and the vibration RMS is shown in FIG. 5. It can be seen from the figure that the vibration RMS increases as the penetration increases at the same speed. Through regression analysis with a linear function, a polynomial function, an exponential function and a logarithmic function, the correlation coefficients $R^2$ are 0.93969, 0.95895, 0.96012 and 0.93544 respectively. The exponential function has the best goodness of fit, indicating that the penetration (P) has a great influence on the vibration of the TBM. A regression analysis process is as follows:

Step 1, a dependent variable and an independent variable are determined through correlation analysis.

Step 2, a scatter diagram is drawn.

Step 3, an appropriate regression model (the linear function, the polynomial, the exponential function, the logarithmic function, etc.) is selected according to the scatter diagram for fitting.

Step 4, relevant inspection is performed.

3) Correlation between the total thrust and the RMS

Figure 6:
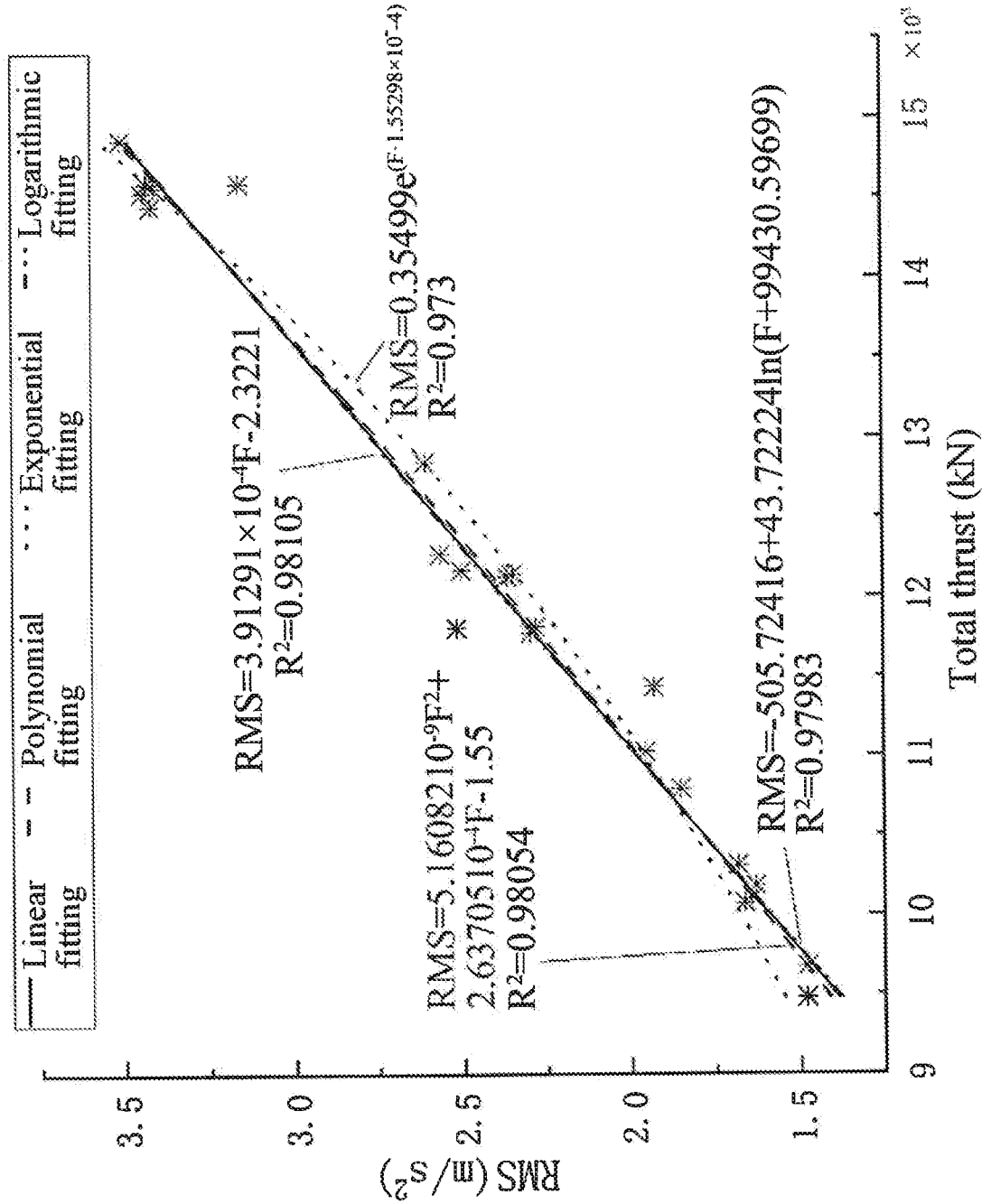
FIG. 6 is a diagram showing a relation between a total thrust and an RMS according to embodiment of the present disclosure.

One of the most important parameters for tunneling of the TBM is the total thrust. Collected data are used to research and analyze the correlation between the total thrust and the RMS, as shown in FIG. 6. It can be found from the figure that the thrust and the vibration RMS satisfy a very desirable linear relation, and the vibration RMS increases as the thrust increases. The correlation coefficient $R^2$ reaches 0.98 or above, and there is a significant correlation between the thrust and the vibration RMS.

4) Correlation between the cutterhead torque (T) and the RMS

Figure 7:
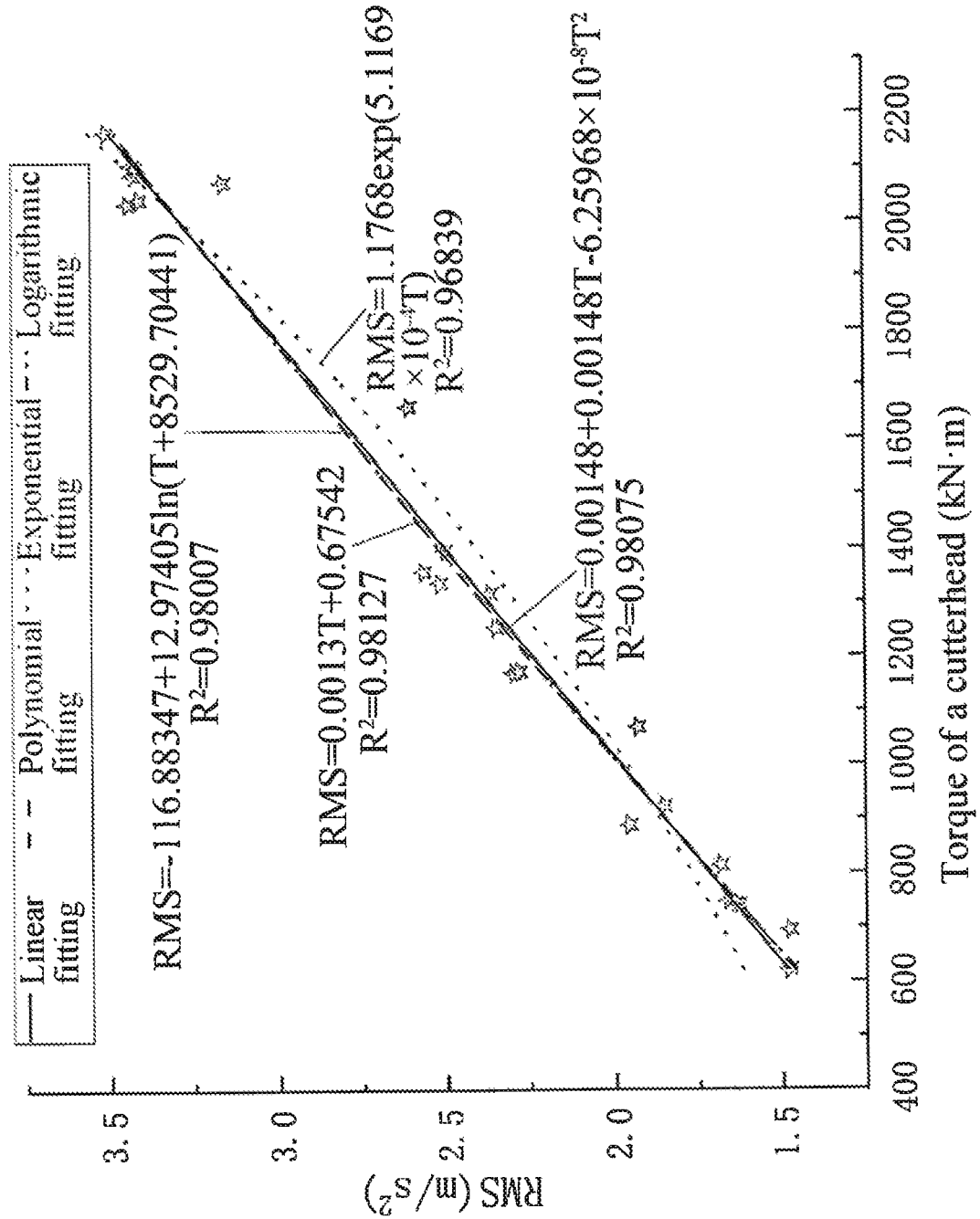
FIG. 7 is a diagram showing a relation between a cutterhead torque and an RMS according to embodiment of the present disclosure.

The cutterhead torque is a power source for cutterhead rotation and directly determines a cutterhead rotation speed. As a result, a change in this parameter will also cause a change in vibration. The collected data are used to research and analyze the correlation between the cutterhead rotation speed and the vibration RMS, as shown in FIG. 7. It can be seen from the figure that the vibration RMS increases as the torque increases, significant linear correlation is shown, and the Pearson correlation coefficient $R^2$ is greater than 0.98.

(2) Feature parameter selection:

Through correlation analysis based on key tunneling parameters including the total thrust (F), the penetration (P), the cutterhead rotation speed (N), the cutterhead torque (T) and the TBM vibration RMS, it is found that the four tunneling parameters have great influence on the vibration RMS under certain geological conditions. In addition, the tunneling parameters are not completely independent of each other. The cutterhead rotation speed and the total thrust are main control parameters, and other tunneling parameters are slave control parameters and closely related to the main control parameters. As a result, comprehensive influence of the four parameters should be considered when a model is established.

During tunneling of the TBM, the thrust is strongly correlation with penetration. A desirable relation is established between the thrust and the penetration through the single-cutter thrust required for penetration of each circle (that is, a field penetration index (FPI)). The FPI can well reflect geological tunneling. The greater the FPI is, the more difficult tunneling is. The smaller the FPI is, the easier tunneling is. As a result, in order to comprehensively consider the influence of the thrust and the penetration on the vibration RMS, the FPI may be used as a geological feature parameter for researching the correlation law with the vibration RMS of the TBM. The field penetration index (FPI) is computed by formula (4) as follows:

$$FPI = F_n / P \tag{4}$$

In the formula, $F_n$ denotes a single-cutter thrust at kN; and P denotes penetration at mm/r.

In order to consider comprehensive influence of the cutterhead rotation speed and torque on the vibration RMS, the relation between the cutterhead torque and speed can be established through power, and the cutterhead power index TNI is used for measurement. The cutterhead power index TNI is calculated by formula (5) as follows:

$$TNI = T \cdot N / 9550 \tag{5}$$

In the formula, T denotes a cutterhead torque at kN·m; and N denotes a cutterhead rotation speed at r/min.

Figure 8:
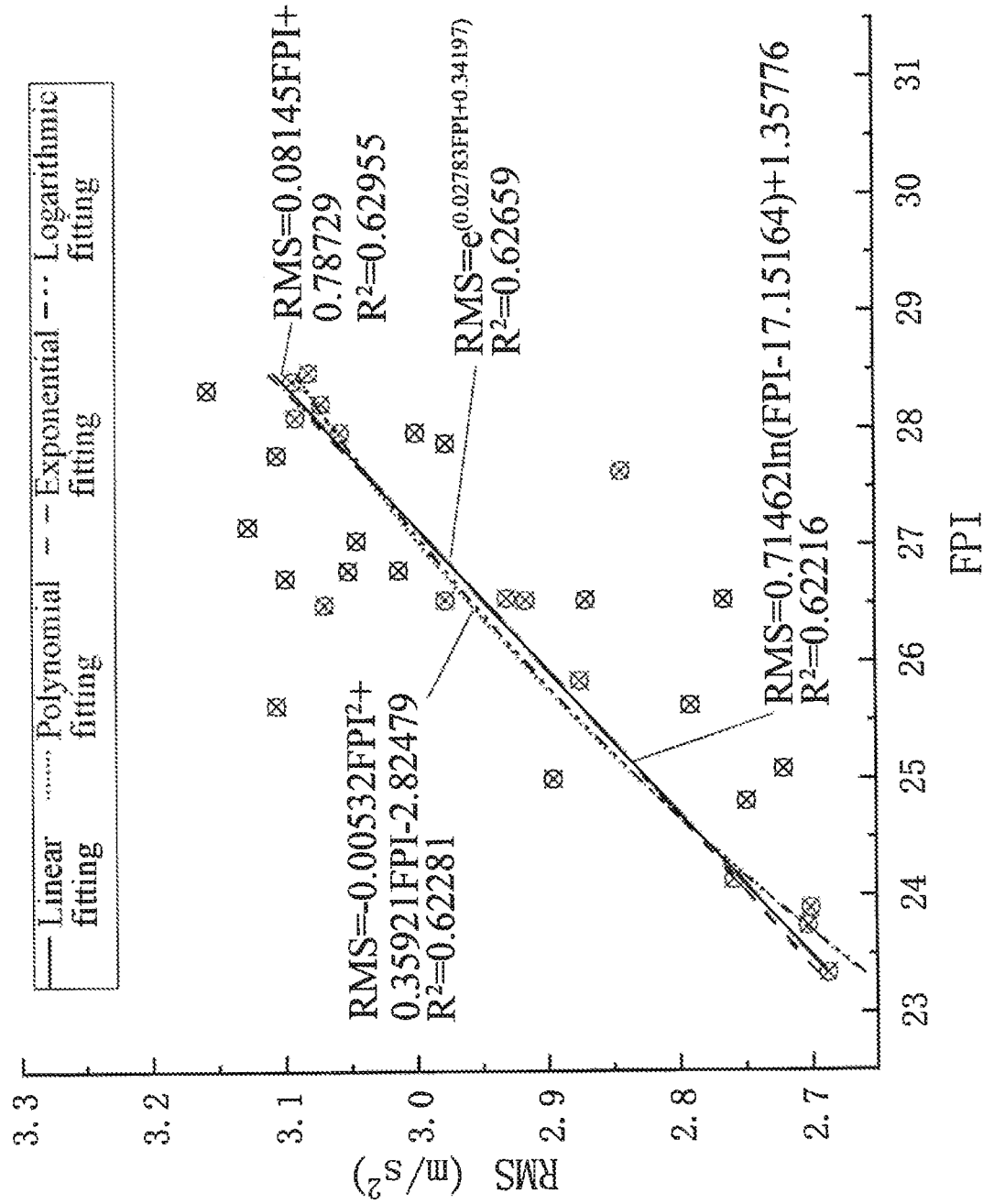
FIG. 8 is a diagram showing the correlation between a field penetration index (FPI) and a vibration feature RMS according to an embodiment of the present disclosure.
Figure 9:
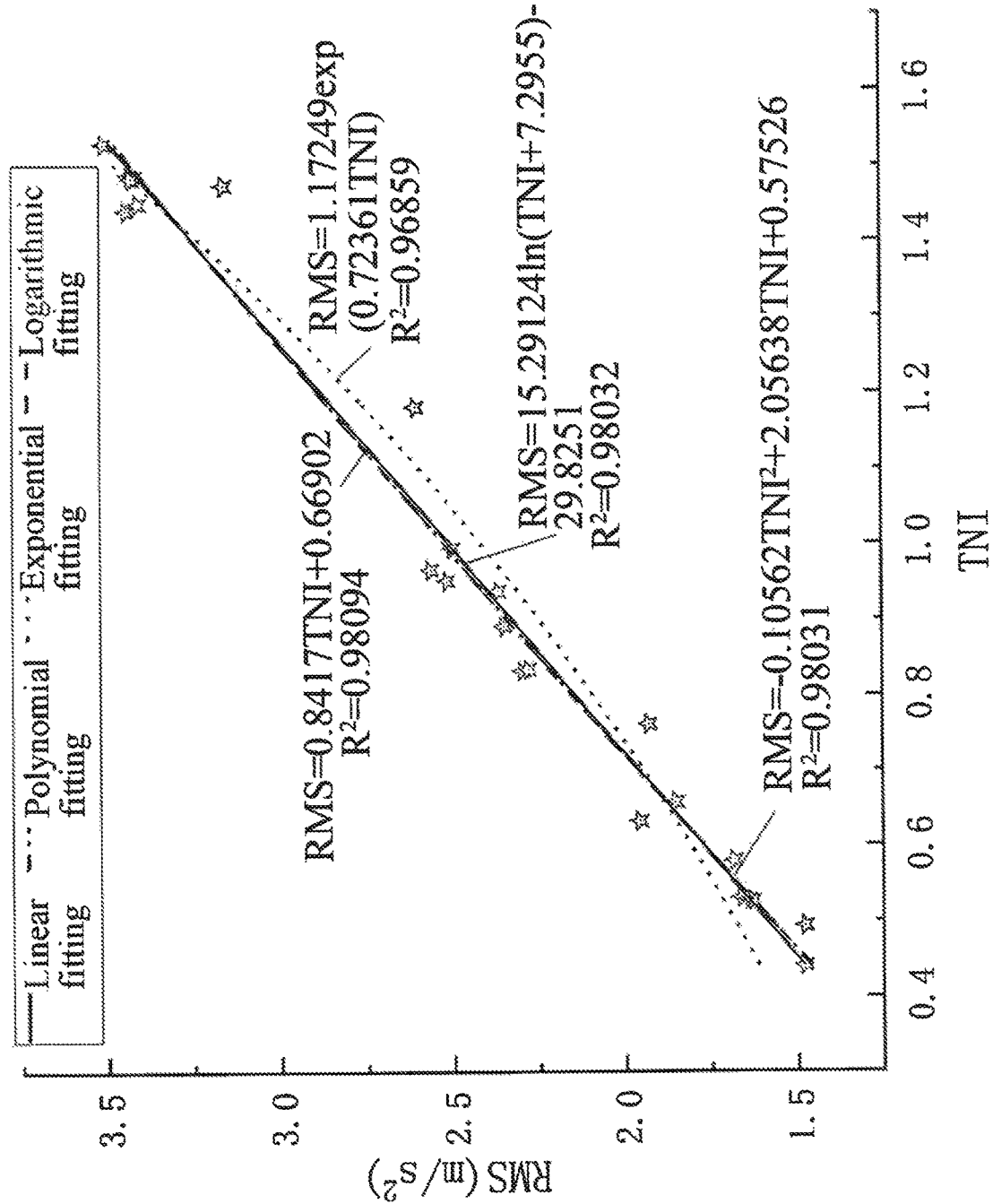
FIG. 9 is a diagram showing the correlation between a cutterhead power index (TNI) and a vibration feature RMS according to embodiment of the present disclosure.

Collected data are used to research and analyze the correlation law between the feature parameter and the vibration RMS. Correlation of the geological feature parameter FPI and the tunneling feature parameter TNI with the vibration feature RMS is shown in FIGS. 8 and 9. From the figures, it can be seen that the field penetration index (FPI) of the geological feature parameter and the cutterhead power index (TNI) of the tunneling feature parameter have positive correlation with the vibration feature RMS. That is, as the FPI and the TNI increase, the vibration RMS also increases, and the optimal models are all linear functions, and the correlation coefficients $R^2$ are 0.63 and 0.98 respectively.

Step 5, establish a multivariate linear regression model:

Through the above research and analysis, the four main tunneling parameters of the TBM have influence on the vibration RMS. The roles of the four main tunneling parameters should be fully considered when the interaction model of the TBM is established, which is also considered by the provided feature parameters. The prediction model for vibration of the TBM main beam is established with the feature parameters FPI and TNI. In-situ tunneling test data are collected, a data set of the vibration RMS and the tunneling feature parameter is established, multivariate linear regression is performed on the data set, and a relation model of the vibration RMS with the FPI and the TNI is obtained as shown in the following formula (6):

$$RMS = \alpha \cdot (-8.51421 \times 10^{-4} \cdot FPI + 1.80941 \cdot TNI + 0.74997) \tag{6}$$

In the formula: a denotes a coefficient of surrounding rock; and a hyphen in the formula is a negative sign. The formula is the relation model between the vibration RMS and the established feature parameters, that is, FPI and TNI may be computed based on N, P, F and T, and then RMS may be computed. It should be noted that the parameters of N, P, F and T can be obtained in real time, so the vibration of TBM can be predicted in real time with these parameters.

The correlation coefficient $R^2$ of the above regression model reaches 0.98, which shows that 98% of the change in the RMS can be explained by the feature parameters FPI and TNI. The FPI and TNI have significant correlation with the vibration RMS.

By using a prediction model established based on Class II of surrounding rock, a coefficient of surrounding rock (D) is set according to different classes of surrounding rock. Vibration signals of Class III, Class IV and Class V of surrounding rock are collected separately. Through statistical analysis, a table of corresponding values of surrounding rock grade coefficients is obtained, as shown in Table 2:

TABLE 2

Values of surrounding rock grade coefficients

| Class of surrounding rock | Coefficient of surrounding rock (a) | Prediction model |
| --- | --- | --- |
| II | 1 | RMS = a · (−8.51421 × |
| III | 0.95-0.98 | $10^{-4}$ · FPI + 1.80941 · |
| IV | 0.3-0.33 | TNI + 0.74997) |
| V | 0.1-0.13 | |

Step 6, verify and analyze the prediction model:

In order to test a prediction effect of the model established in step 5, an in-situ tunneling test is performed by selecting a TBM7 tunnel section with a pile number of 158+228.26-158+253.26, Class II of surrounding rock (having desirable integrity and underdeveloped fractures) and lithology of tuff sandstone. A TBM main driver takes charge of driving normally throughout the tunneling. For the collected vibration feature RMS, an average and feature parameters are taken per minute as a group of data. Then, 40 groups of data from a stable tunneling section are randomly selected for analyzing a relative error between actual values and predicted values of the vibration RMS. At the same time, in order to verify the universality of the model, a tunneling test is performed by selecting a TBM8 tunnel section with a pile number of 181+660.2-181+662.05, Class II of surrounding rock (having desirable integrity) and lithology of granodiorite. Then, 40 groups of data from a stable tunneling section are randomly selected for comparative analysis.

Figure 10:
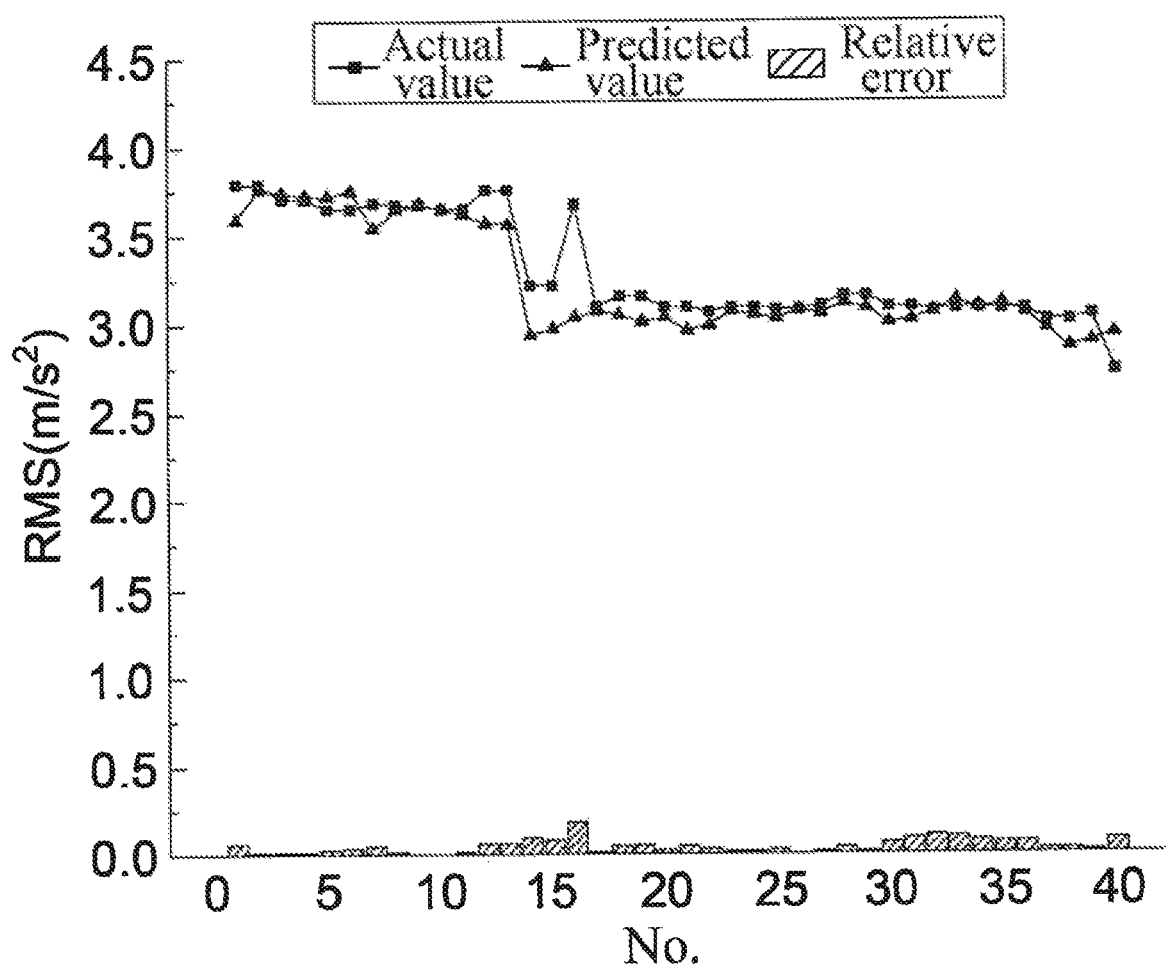
FIG. 10 is a comparison diagram of an actual value and a predicted value in a TBM7 tunnel section according to an embodiment of the present disclosure.
Figure 11:
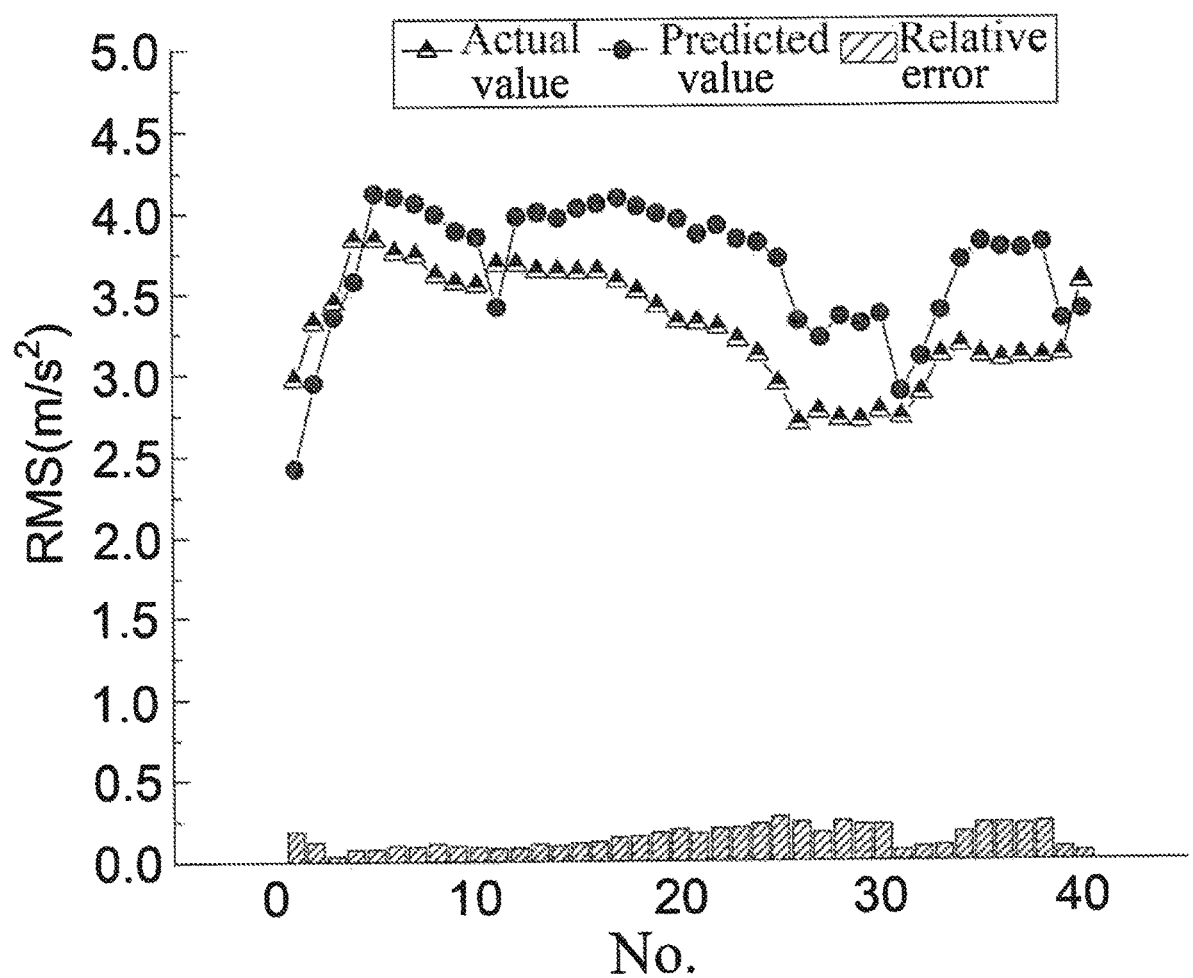
FIG. 11 is a comparison diagram of an actual value and a predicted value in a TBM8 tunnel section according to an embodiment of the present disclosure.

The comparison between the predicted value and the actual values is shown in FIGS. 10 and 11. Through the comparative analysis between the predicted value and the actual values, it can be seen from the figures that the predicted values of the vibration RMS of the same TBM and the actual values in the same bid section are very close to each other, with a maximum relative error for prediction of 17%, and an average relative error of 3.8%. A desirable prediction effect is achieved. On the TBM8, the predicted values are generally slightly higher than the actual values, and overall prediction errors are slightly higher than those of TBM7, which may be mainly caused by different lithology. The average relative error for prediction is 14%, which is also acceptable and indicated that the established prediction model had a certain universality.

Figure 12:
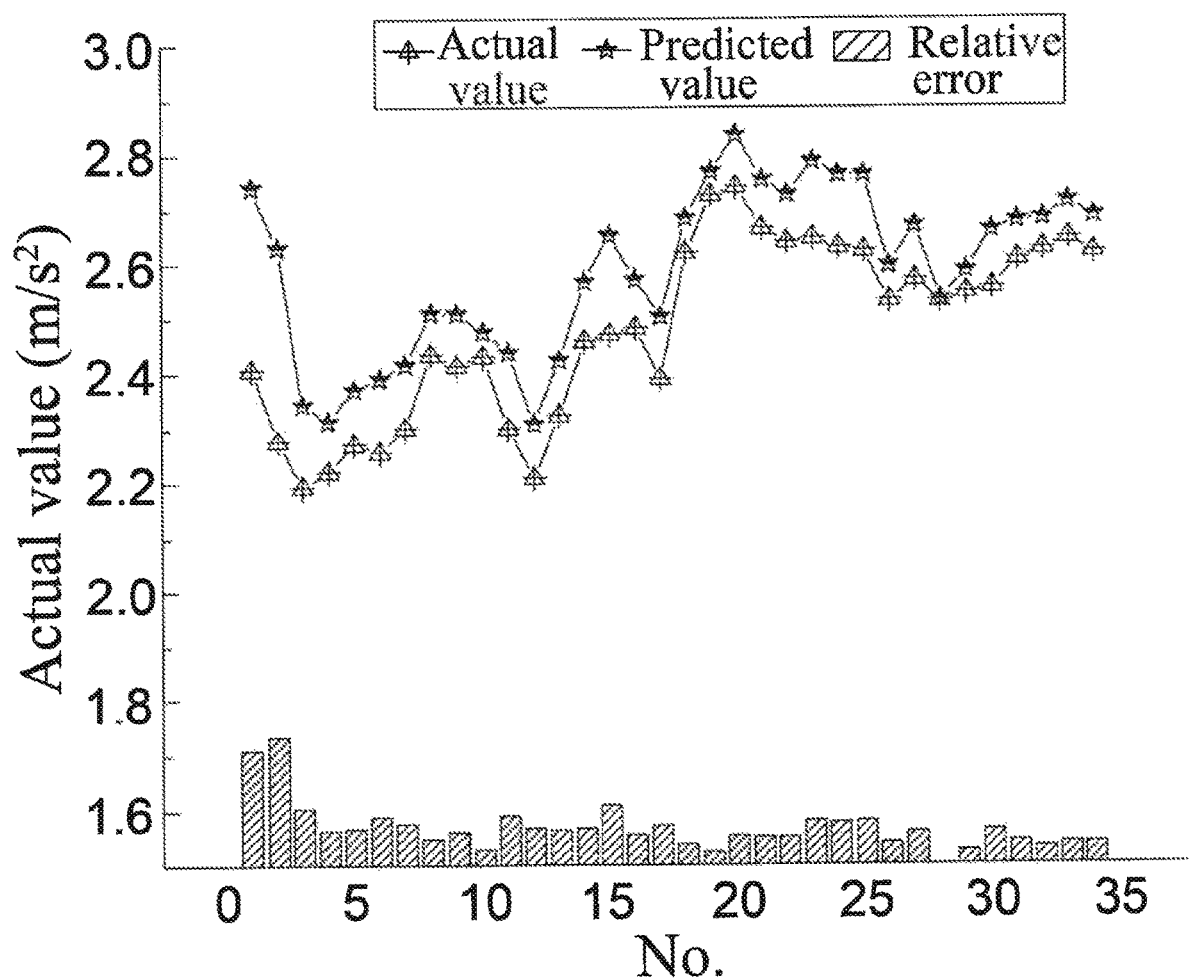
FIG. 12 is a comparison diagram of an actual value and a predicted value of Class III of surrounding rock according to an embodiment of the present disclosure.
Figure 13:
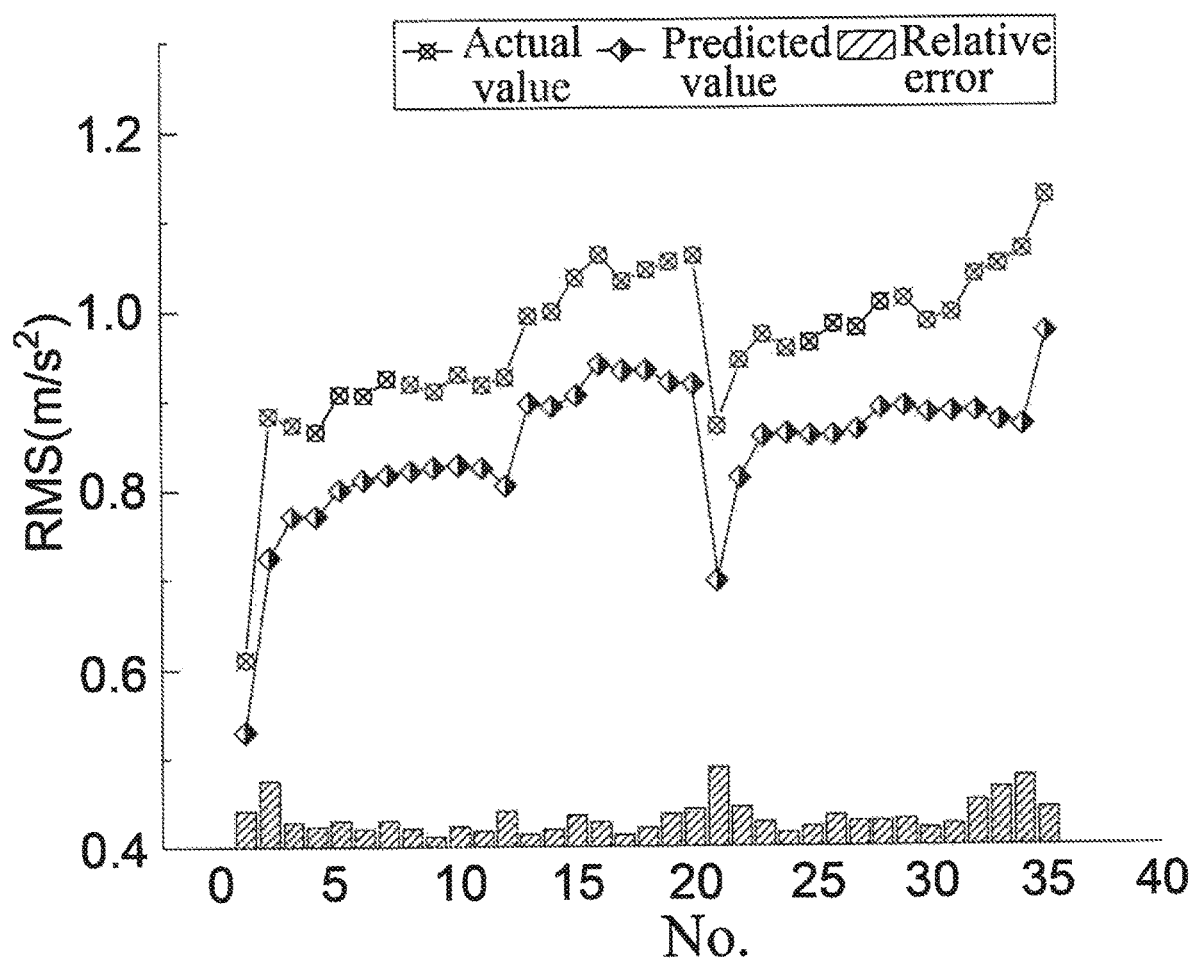
FIG. 13 is a comparison diagram of an actual value and a predicted value of Class IV of surrounding rock according to an embodiment of the present disclosure.
Figure 14:
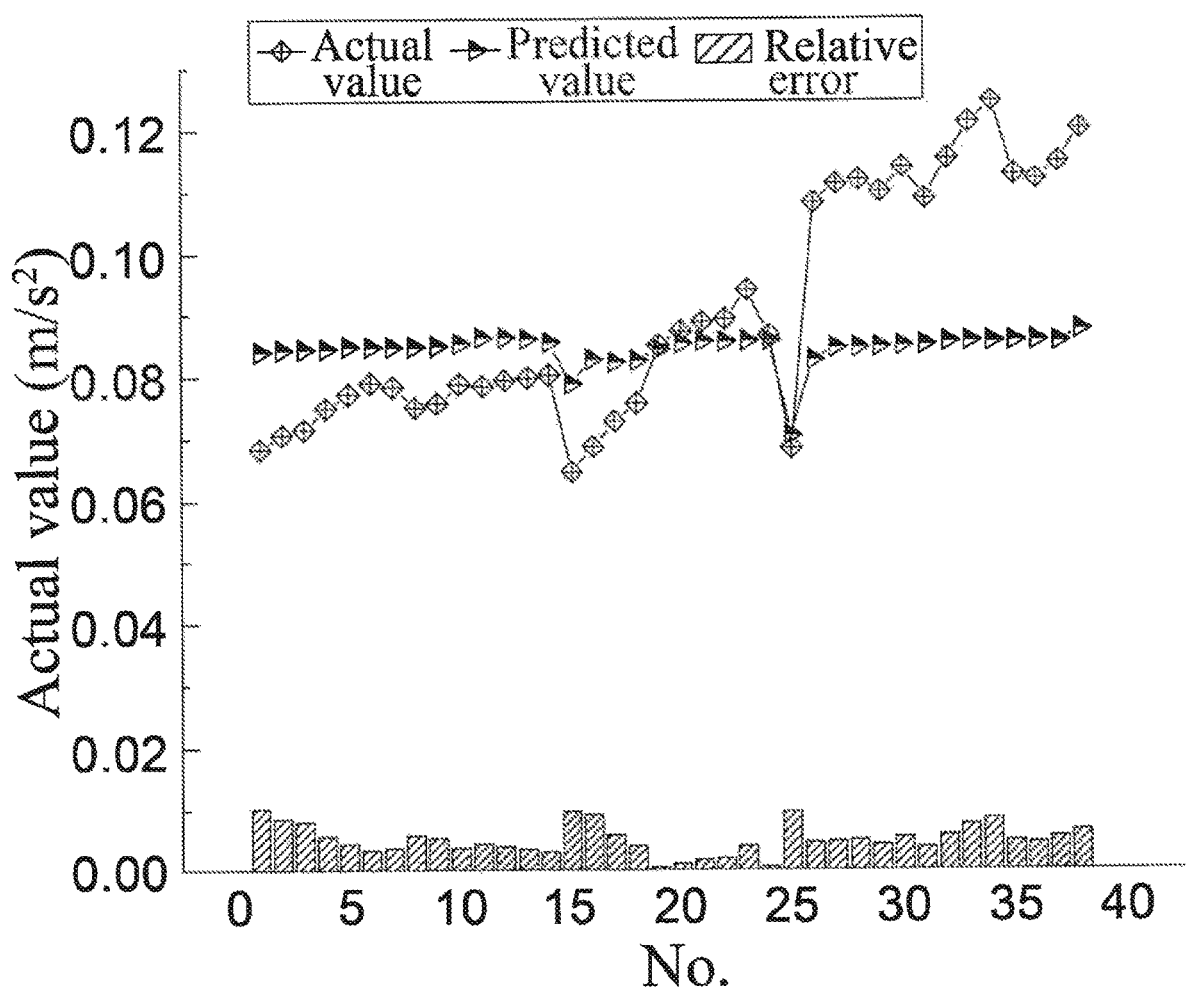
FIG. 14 is a comparison diagram of an actual value and a predicted value of Class V of surrounding rock according to an embodiment of the present disclosure.

In order to further enrich the geological classes and improve reliability of the prediction model, a TBM7 tunnel section with a pile number of 167+255.17-167+247.90, Class III of surrounding rock (having a rock mass strength of 70 MPa-80 MPa) and lithology of tuff sandstone, a TBM7 tunnel section with a pile number of 166+817.10-166+801.44, Class IV of surrounding rock (having a rock mass strength of 70 MPa-80 MPa) and lithology of tuff sandstone, and a TBM7 tunnel section with a pile number of 168+782-168+760, Class V of surrounding rock (having a rock mass strength of 30 MPa-40 MPa) and lithology of carbonaceous shale are selected separately. Vibration signals during tunneling are collected, and the prediction model is verified and analyzed. The comparison between actual values and predicted values is shown in FIGS. 12-14.

Through the above analysis, it can be seen that a maximum relative error and an average relative error of Class III of surrounding rock are 16% and 5% respectively. A maximum relative error and an average relative error of Class IV of surrounding rock are 20% and 12% respectively. A maximum relative error and an average relative error of Class IV of surrounding rock are 23% and 11% respectively, which indicates that the model has a desirable prediction effect and wide applicability.

It should be noted that the in-situ tunneling test is performed on a TBM with the same specification from the same manufacturer, and by selecting a plurality of typical tunnel sections. In this way, feasibility of obtaining the vibration magnitude of the TBM in real time through the relevant parameters of the TBM is explored. Through the present disclosure, it can be found that the feasibility is verified, which lays a certain foundation for subsequent research and enrichment of the prediction models under different apparatuses and different geological conditions.

To sum up, according to the present disclosure, the multivariate linear model that is established by comprehensively considering the influence of the tunneling parameters on the vibration of the TBM main beam through the in-situ tunneling test is generally reliable. The quantitative relation between the feature parameters and the vibration feature RMS of the TBM main beam is given, such that the vibration information of the TBM main beam can be obtained in real time without mounting a traditional sensing test system. In this way, the driver can be instructed to adjust the tunneling parameters to avoid abnormal damage to the TBM caused by excessive vibration. The specific conclusions are as follows:

1. The vibration RMS of the TBM increases as the main tunneling parameters (the cutterhead rotation speed (N), the cutterhead torque (T), the thrust F and the penetration (P)) increase, and the main tunnel parameters have significant correlation with each other.

2. The geological feature parameter FPI and the tunneling feature parameter TNI are provided by comprehensively considering the influence of geological factors and the tunneling parameters on the vibration of the TBM, and have strong correlation and extremely strong correlation with the vibration feature RMS respectively.

3. Through actual verification, the multivariate linear regression prediction model of the TBM vibration based on the two feature parameters is suitable for different classes and different kinds of lithology of surrounding rock. The average relative error for the prediction is less than 12%, and the desirable prediction effect is achieved.

Many specific details are set forth in the description described above to facilitate full understanding of the present disclosure, but the present disclosure can also be implemented in other ways different from those described herein, similar derivatives can be made by those skilled in the art without departing from the contents of the present disclosure, and the present disclosure is not limited by the specific embodiments disclosed above accordingly.

What is claimed is:

1. A method for identifying a vibration magnitude of a tunnel boring machine (TBM) main beam using a geological feature parameter and a tunneling feature parameter constructed based on TBM tunneling parameters, comprising:

step 1, arranging a vibration measurement point in a front section of the TBM main beam, performing an in-situ tunneling test, collecting data of tunneling parameters, geological parameters and vibration parameters of the main beam of a TBM during tunneling for establishing a database;

step 2, preprocessing the tunneling parameters and preprocessing the vibration parameters of the main beam;

step 3, determining that four tunneling parameters of the TBM have correlation with a vibration root mean square (RMS) of the TMB main beam by a data statistics method, wherein the four tunneling parameters comprise a penetration (P), a total thrust (F), a cutterhead rotation speed (N) and a cutterhead torque (T);

step 4, determining a correlation law between a vibration feature of the main beam and the tunneling parameters of the TBM, comprising:
(1) determining influence of the tunneling parameters on the vibration feature of the TBM main beam, wherein an internal feedback relationship exists among the tunneling parameters of the penetration (P), the total thrust (F), the cutterhead rotation speed (N) and the cutterhead torque (T) of the TBM during tunneling, that is, the greater the total thrust (F) is, the greater the penetration (P) is; a tunneling speed V=N*P; and a cutterhead power is equal to the cutterhead torque (T) multiplied by the rotation speed (N);
(2) selecting a feature parameter, wherein a field penetration index (FPI) of the geological feature parameter and a cutterhead power index TNI of the tunneling feature parameter have positive correlation with the vibration RMS;

step 5, collecting in-situ tunneling test data, establishing a data set of the vibration RMS and the tunneling feature parameter, and performing multivariate linear regression on the data set to obtain a multivariate linear regression model of the vibration RMS with the FPI and the TNI as shown in the following formula (6):

RMS=α·(−8.51421×10⁻⁴·$FPI$+1.80941·$TNI$+0.74997)  (6)

where α denotes a coefficient of surrounding rock, a correlation coefficient $R^2$ of the relation model reaches 0.98, and the FPI and the TNI have correlation with the vibration RMS; and step 6, sensing vibration information of the TBM main beam in real time based on the multivariate linear regression model, and adjusting the tunneling parameters based on the vibration information; and controlling, by a programmable logic controller, the TBM based on the adjusted tunneling parameters to avoid abnormal damage to the TBM.

2. The vibration prediction method based on a geological feature parameter and a tunneling feature parameter for a TBM main beam according to claim 1, wherein the performing an in-situ tunneling test in step 1 comprises:
(1) performing a test 1: keeping the cutterhead rotation speed (N) constant, adjusting the penetration (P), and collecting vibration information of the TBM main beam;
(2) performing a test 2: keeping the penetration (P) constant, adjusting the cutterhead rotation speed (N), and collecting a vibration signal of the TBM main beam; and
(3) performing a test 3: collecting vibration information of the TBM during tunneling under different surrounding rock conditions.

3. The vibration prediction method based on a geological feature parameter and a tunneling feature parameter for a TBM main beam according to claim 1, wherein the preprocessing the tunneling parameters and preprocessing the vibration parameters of the main beam comprises:
pre-processing the tunneling parameters: forming a decision function f(x) as shown in formula (1) by selecting control parameters the cutterhead rotation speed (N), a thrust speed v, the total thrust (F), the cutterhead torque (T) and the penetration (P) of the TBM, and determining a working state of the TBM by determining whether a value of the function is equal to 0, wherein f(x)=1 indicates a normal working state, and f(x)=0 indicates a non-working state;

$$f(x) = f(N) \cdot f(v) \cdot f(F) \cdot f(T) \cdot f(P) \quad (1)$$

$$f(x) = \begin{cases} 0, & (x=0) \\ 1, & (x \neq 0) \end{cases}$$

where f(N), f(v), f(F), f(T) and f(P) denote binary decision functions of the cutterhead rotation speed, the cutterhead thrust, the thrust speed, the cutterhead torque and the penetration respectively; and pre-processing the vibration parameters of the main beam: removing a trend item of a vibration signal collected of the main beam by a polynomial least square method and performing direct current removal and filtering, and performing analysis with an effective value of acceleration that denotes signal vibration energy, wherein the effective value of vibration acceleration of the main beam is computed by formula (2) as follows:

$$x_{RMS} = \left(\frac{1}{n}\sum_{i=0}^{n-1} x_i^2\right)^{\frac{1}{2}} \quad (2)$$

where $x_i$ denotes a vibration acceleration and $x_{RMS}$ denotes the effective value of the vibration acceleration.

4. The vibration prediction method based on a geological feature parameter and a tunneling feature parameter for a TBM main beam according to claim 1, wherein step 4 comprises:
(1) performing regression on a relation between the tunneling parameters and a vibration feature RMS with an exponential model, a linear model, a polynomial model, a power function model and a logarithmic model, evaluating an advantage and a disadvantage of the regression model with the correlation coefficient $R^2$, and establishing an optimal regression model, wherein the correlation coefficient $R^2$ is computed by formula (3) as follows:

$$R^2 = 1 - \frac{\sum_{i=1}^{m}(\tilde{y}_i - y_i)^2}{\sum_{i=1}^{m}(\bar{y}_i - y_i)^2} \quad (3)$$

where $\tilde{y}_i$ denotes a predicted value of a sample, $\bar{y}_i$ denotes an average, and $y_i$ denotes an actual value; and
(2) calculating the field penetration index (FPI) by formula (4) as follows:

FPI=Fn/P  (4)

where $F_n$ denotes a single-cutter thrust, kN; and P denotes a penetration, mm/r; and
computing the cutterhead power index TNI by formula (5) as follows:

TNI=T·N/9550  (5)

where T denotes a cutterhead torque at kN·m; and N denotes a cutterhead rotation speed at r/min.

* * * * *